United States Patent [19]

Brambilla et al.

[11] Patent Number: 5,678,463
[45] Date of Patent: Oct. 21, 1997

[54] PROCESS FOR THE GLOBAL CONTROL OF A DRIVE UNIT FOR A GEARBOX OPERATED BY A HYDROSTATIC SYSTEM

[75] Inventors: Alberto Brambilla, Rodengo Saiano, Italy; Ignace Danneels, Oudenburg, Belgium

[73] Assignee: Clark-Hurth Components S.p.A., Arco, Italy

[21] Appl. No.: 574,778

[22] Filed: Dec. 19, 1995

[30] Foreign Application Priority Data

Dec. 27, 1994 [IT] Italy .................. MI94A2655

[51] Int. Cl.$^6$ .................................................. F16H 47/00
[52] U.S. Cl. ................................... 74/733.1; 74/731.1
[58] Field of Search ........................ 477/52, 68, 69, 477/131, 133, 139; 74/655, 732.1, 733.1, 731.1; 475/82, 209

[56] References Cited

U.S. PATENT DOCUMENTS

| | | |
|---|---|---|
| 3,463,034 | 8/1969 | Miller ................... 74/733.1 |
| 3,864,991 | 2/1975 | Nembach ............... 74/733.1 |
| 4,187,739 | 2/1980 | Hamma et al. ......... 74/733.1 |
| 4,766,779 | 8/1988 | Massy . |
| 4,939,954 | 7/1990 | Walzer et al. .......... 74/733.1 |
| 5,193,416 | 3/1993 | Kanayama .............. 74/733.1 |

FOREIGN PATENT DOCUMENTS

| | | |
|---|---|---|
| 0282010 | 9/1988 | European Pat. Off. . |
| 0339346 | 11/1989 | European Pat. Off. . |
| 2652976 | 5/1978 | Germany . |

*Primary Examiner*—Charles A. Marmor
*Assistant Examiner*—Sherry Lynn Estremsky
*Attorney, Agent, or Firm*—Dressler, Rockey, Milnamow & Katz, Ltd.

[57] ABSTRACT

A process for the global control of a drive unit for a gearbox operated by a hydrostatic system, for a vehicle equipped with at least two gears, comprising an appropriate sequence of steps, performed with preset timings, for activating and deactivating electric valves and for varying the displacement of a hydrostatic motor and of a hydrostatic pump in order to shift gear. The various steps of the sequence are controlled by an electronic control unit.

43 Claims, 3 Drawing Sheets

| INDEX | MODE | UP-SHIFTING OR DOWN-SHIFTING | FORWARD OR REVERSE GEAR | HYDROSTATIC NEUTRAL | FORWARD OR REVERSE GEAR RE-ENGAGEMENT | UP- OR DOWN-SHIFTING | DOWN-SHIFTING VALVE ACTIVATION | DOWN-SHIFTING VALVE DEACTIVATION |
|---|---|---|---|---|---|---|---|---|
| 1 | 0 | U | F | 8÷32 | 16-64 | 12-48 | 0-4 | 0-48 |
| 2 | 1 | U | F | 0÷4 | 7-28 | 5-20 | 0-5 | 0-4 |
| 3 | 2 | U | F | 0÷6 | 10-40 | 5-20 | 0-8 | 0-6 |
| 4 | 3 | U | F | 0÷5 | 10-40 | 5-20 | 0-7 | 0-8 |
| 5 | 4 | U | F | 0÷7 | 0-4 | 0-4 | 0-6 | 0-7 |
| 6 | 0 | U | R | 8÷30 | 16-60 | 12-45 | 0-4 | 0-35 |
| 7 | 1 | U | R | 0÷4 | 7-28 | 5-20 | 0-7 | 0-4 |
| 8 | 2 | U | R | 0÷7 | 10-40 | 5-20 | 0-5 | 0-7 |
| 9 | 3 | U | R | 0÷5 | 10-40 | 5-20 | 0-8 | 0-5 |
| 10 | 4 | U | R | 0÷6 | 0-4 | 0-4 | 0-6 | 0-6 |
| 11 | 0 | D | F | 0÷4 | 10-35 | 13-50 | 8-32 | 10-40 |
| 12 | 1 | D | F | 0÷5 | 10-35 | 13-52 | 8-32 | 10-35 |
| 13 | 2 | D | F | 0÷7 | 10-40 | 13-52 | 8-30 | 10-35 |
| 14 | 3 | D | F | 0÷8 | 10-40 | 13-50 | 8-30 | 10-40 |
| 15 | 4 | D | F | 0÷6 | 0-4 | 0-4 | 0-4 | 0-4 |
| 16 | 0 | D | R | 0÷4 | 10-35 | 13-50 | 8-30 | 10-35 |
| 17 | 1 | D | R | 0÷7 | 10-40 | 13-52 | 8-30 | 10-40 |
| 18 | 2 | D | R | 0÷5 | 10-35 | 13-50 | 8-32 | 10-35 |
| 19 | 3 | D | R | 0÷8 | 10-40 | 13-52 | 8-32 | 10-40 |
| 20 | 4 | D | R | 0÷6 | 0-4 | 0-4 | 0-4 | 0-4 |

VALVE 19    SWITCH 31

| MODE | FIXED OUTPUT | KICK-DOWN |
|---|---|---|
| 0 | 0 | 0 |
| 1 | 0 | 1 |
| 2 | 1 | 0 |
| 3 | 1 | 1 |
| 4 | REDUCED OUTPUT SPEED = MAX SPEED/7 | |

TIME CYCLE = 1/48 s

FIG. 2

| INDEX | MODE | UP-SHIFTING OR DOWN-SHIFTING | FORWARD OR REVERSE GEAR | HYDROSTATIC NEUTRAL | FORWARD OR REVERSE GEAR RE-ENGAGEMENT | UP- OR DOWN-SHIFTING | DOWN-SHIFTING VALVE ACTIVATION | DOWN-SHIFTING VALVE DEACTIVATION | NEUTRAL IN THE TRANSMISSION |
|---|---|---|---|---|---|---|---|---|---|
| 1 | 0 | U | F | 8÷32 | 16-64 | 12-48 | 0-4 | 0-48 | 0÷8 |
| 2 | 1 | U | F | 0÷4 | 7-28 | 5-20 | 0-5 | 0-4 | 0÷6 |
| 3 | 2 | U | F | 0÷6 | 10-40 | 5-20 | 0-8 | 0-6 | 0÷5 |
| 4 | 3 | U | F | 0÷5 | 10-40 | 5-20 | 0-7 | 0-8 | 0÷4 |
| 5 | 4 | U | F | 0÷7 | 0-4 | 0-4 | 0-6 | 0-7 | 0÷7 |
| 6 | 0 | U | R | 8÷30 | 16-60 | 12-45 | 0-4 | 0-35 | 0÷8 |
| 7 | 1 | U | R | 0÷4 | 7-28 | 5-20 | 0-7 | 0-4 | 0÷5 |
| 8 | 2 | U | R | 0÷7 | 10-40 | 5-20 | 0-5 | 0-7 | 0÷6 |
| 9 | 3 | U | R | 0÷5 | 10-40 | 5-20 | 0-8 | 0-5 | 0÷4 |
| 10 | 4 | U | R | 0÷6 | 0-4 | 0-4 | 0-6 | 0-6 | 0÷7 |
| 11 | 0 | D | F | 0÷4 | 10-35 | 13-50 | 8-32 | 10-40 | 0-8 |
| 12 | 1 | D | F | 0÷5 | 10-35 | 13-52 | 8-32 | 10-35 | 0-4 |
| 13 | 2 | D | F | 0÷7 | 10-40 | 13-52 | 8-30 | 10-35 | 0-7 |
| 14 | 3 | D | F | 0÷8 | 10-40 | 13-50 | 8-30 | 10-40 | 0-5 |
| 15 | 4 | D | F | 0÷6 | 0-4 | 0-4 | 0-4 | 0-4 | 0-6 |
| 16 | 0 | D | R | 0÷4 | 10-35 | 13-50 | 8-30 | 10-35 | 0-8 |
| 17 | 1 | D | R | 0÷7 | 10-40 | 13-52 | 8-30 | 10-40 | 0-7 |
| 18 | 2 | D | R | 0÷5 | 10-35 | 13-50 | 8-32 | 10-35 | 0-5 |
| 19 | 3 | D | R | 0÷8 | 10-40 | 13-52 | 8-32 | 10-40 | 0-4 |
| 20 | 4 | D | R | 0÷6 | 0-4 | 0-4 | 0-4 | 0-4 | 0-6 |

VALVE 19   SWITCH 31

| MODE | FIXED OUTPUT | KICK-DOWN |
|---|---|---|
| 0 | 0 | 0 |
| 1 | 0 | 1 |
| 2 | 1 | 0 |
| 3 | 1 | 1 |
| 4 | REDUCED OUTPUT SPEED = MAX SPEED/7 | |

TIME CYCLE = 1/48 s

Fig. 3

PROCESS FOR THE GLOBAL CONTROL OF A DRIVE UNIT FOR A GEARBOX OPERATED BY A HYDROSTATIC SYSTEM

BACKGROUND OF THE INVENTION

The present invention relates to a process for the global control of a drive unit for a gearbox operated by a hydrostatic system, particularly adapted for industrial vehicles in general, in which the speed control provided by the hydrostatic transmission must be associated with a gearbox having two or more speeds.

The problem of shifting gears for a vehicle equipped with an automatic gearbox is known in the art, particularly when the vehicle is climbing an inclined road and therefore down-shifting is necessary.

Accordingly, a drawback of conventional solutions is that it is difficult for the hydrostatic motor to change speed during gear shifting, since it is necessary to vary the displacement of the motor pump as a consequence of the limited compressibility of oil. The drawback actually is not caused by the components of the hydrostatic control system or by the valves, since excellent control systems have long been known, but by the control sequence of the associated control processor.

Another drawback of conventional devices is the fact that they produce knocking and vibrations during gear shifts produced by the control systems known so far. Such knocking and vibrations are harmful, since they tend to damage the mechanical parts of the vehicle and shorten their working life.

Consequently, the driver of the vehicle, as well as any passengers thereof, are furthermore subjected to unpleasant sudden accelerations and decelerations and travel comfort is severely compromised.

Another consequence of the knocking and vibrations during gear shifting is the drawback that frequent maintenance is required, since the mechanical parts wear easily.

SUMMARY OF THE INVENTION

A principal aim of the present invention is therefore to provide a process for the global control of a drive unit for a gearbox operated by a hydrostatic system that is capable of achieving improved quality in gear shifting.

Within the scope of this aim, an object of the present invention is to eliminate or substantially reduce knocking and vibrations during gear shifts produced by the control systems known so far.

Another object of the present invention is to provide a global control process capable of eliminating or substantially reducing the knocks and vibrations related to gear shifts, in order to ensure greater travel comfort both for the driver and for any passengers of the vehicle.

Another object of the present invention is to provide a global control process that is highly reliable, simple to provide, and at low costs.

This aim, these objects, and others which will become apparent hereinafter are achieved by a process for the global control of a drive unit for a gearbox operated by a hydrostatic system for a vehicle equipped with at least two gears, wherein said vehicle is in a condition for up-shifting in a forward gear, in mode 0; characterized in that said control process, provided by processing and control means having a plurality of inputs and outputs, comprises the following steps: selecting the neutral of the hydrostatic pump at least $8/48$ s and no more than $32/48$ s after time zero, when the gear shifting conditions occur; reselecting the forward gear at least $16/48$ s and no more than $64/48$ s after time zero; selecting up-shifting at least $12/48$ s and no more than 1 s after time zero; activating the down-shifting valve at least 0 s and no more than $4/48$ s after time zero; and deactivating the down-shifting valve at least 0 s and no more than 1 s after time zero.

BRIEF DESCRIPTION OF THE DRAWINGS

Further characteristics and advantages of the invention will become apparent from the following detailed description of a preferred but not exclusive embodiment of the control process according to the invention, illustrated only by way of non-limitative example in the accompanying drawings, wherein:

FIG. 2 is a table listing the optimum time intervals for activating the components of the apparatus of FIG. 1 according to the control process according to the invention;

FIG. 3 is a table listing the same time intervals as FIG. 2, with the addition of an extra column related to an optional step for activating the components of the apparatus of FIG. 1 according to the control process according to the invention.

DESCRIPTION OF THE PREFERRED EMBODIMENTS

Figure 1:
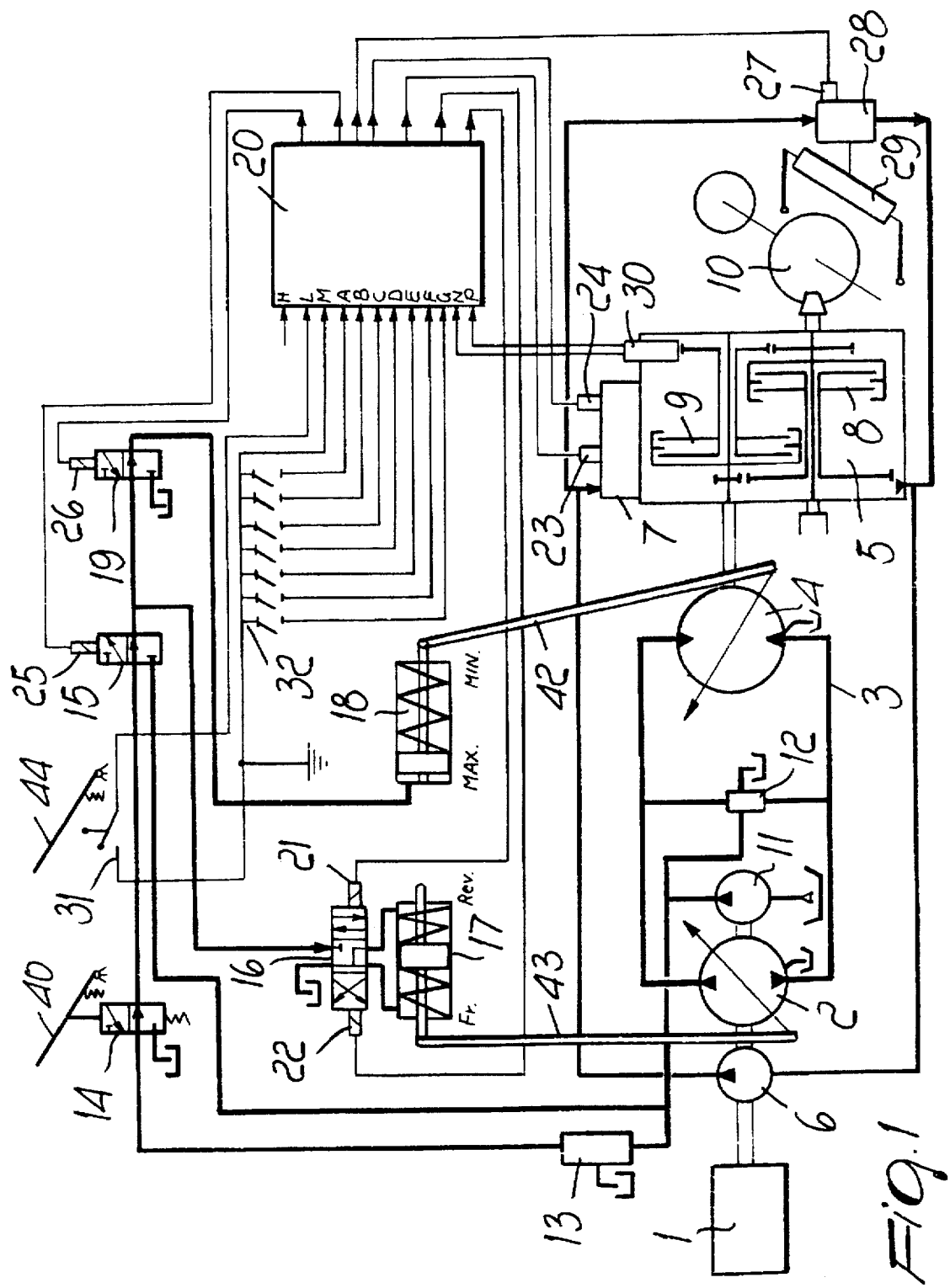
FIG. 1 is a view of a possible actuation and control apparatus for a drive unit for a gearbox operated by a hydrostatic system, to which the control process according to the invention is applied.

With reference to FIG. 1, a possible apparatus to which the control process according to the invention is applied comprises a Diesel engine 1 with which a variable-displacement pump 2 is associated; said pump, by means of the pipes 3, drives a variable-displacement motor 4 connected to the transmission 5.

A circulation pump 6 is furthermore associated with said engine 1, draws oil from the lower part of the transmission 5, and sends it into the valve 7 of the gearbox in order to ensure correct pressure selectively to the first-gear clutch 8 or to the second-gear clutch 9. In this manner, the power of the hydrostatic motor 4 can be transferred to the axle 10 mechanically.

The transmission 5 also comprises an output speed measurement device 30.

An additional pump 11 (loading pump) is associated with the engine 1 and is adapted to provide an output that compensates for oil leaks in the various points of the hydrostatic circuit by means of an appropriate valve 12.

Said loading pump 11, by means of a valve 13, supplies a pressure that is proportional to the rpm rate of the Diesel engine 1; this pressure is used to control the displacements of the pump 2 and of the hydrostatic motor 4, so that when the Diesel engine 1 is at its minimum rpm the pump 2 is at its minimum displacement and the motor 4 is instead at its maximum displacement. If the Diesel engine 1 is at its peak rpm, the pump 2 is instead at its maximum displacement and the motor 4 is at its minimum displacement.

A special valve 14 is furthermore provided in the control system. Said valve is actuated by a pedal 40, known as inching pedal, and is adapted to intervene in conditions when maximum power combined with a reduced speed is required.

Another valve 15 (down-shifting valve) is insertable in the circuit to achieve the opposite effect with respect to the one produced by the valve 14.

The valve 15 is actuated by a down-shifting solenoid 25.

A valve 16 with three positions (Forward-Neutral-Reverse) is provided in series to the valve 15 and is connected to a cylinder 17 having a piston and a rod 43 and controlling the displacement of the pump 2.

The piston of the cylinder 17 operates in contrast with springs. The valve 16 is actuated by two solenoids 21 and 22, respectively for the forward gears (F) and for the reverse gears (R).

Another cylinder 18 is connected on the same line and is provided with a piston which controls the displacement of the motor 4 by means of a rod 42. This second cylinder, too, operates in contrast with a spring adapted to return the motor 4 to its maximum displacement, whereas the rpm rate of the Diesel engine 1 and the displacement of the pump 2 determine the output rate of the hydrostatic motor 4.

An additional valve 19 is insertable in the circuit between the valve 16 that controls the pump 2 and the piston 18 that controls the displacement of the motor 4; said valve is adapted to keep the hydrostatic motor 4 always at its maximum displacement.

The described circuit is controlled by processing and control means appropriately constituted by an electronic control unit 20 provided with seven outputs that are adapted to control the following items:

1) forward-gear solenoid 21 (in the valve 16);

2) reverse-gear solenoid 22 (in the valve 16);

3) second-gear solenoid 23 (in the valve 7);

4) first-gear solenoid 24 (in the valve 7);

5) down-shifting solenoid 25 (in the valve 15);

6) solenoid 26 for locking the motor 4 at its maximum displacement (in the valve 19);

7) solenoid 27 for actuating the parking brake. This solenoid acts on a valve 28 that actuates a cylinder 29 that is closed by springs and opened by hydraulic pressure.

The electronic control unit has the following twelve inputs:

1) positive battery lead (designated by H);

2) negative battery lead (M);

3)+(4) connectors (N, P) for the output speed measurement device 30;

5) kick-down signal 31 (designated by L in the control unit 20) under the accelerator pedal 44;

6) neutral/forward gear signal (A);

7) neutral/reverse gear signal (B);

8) signal (C) indicating variable/fixed displacement of the hydrostatic motor 4;

9) automatic/fixed first gear signal (D);

10) automatic/fixed second gear signal (E);

11) normal/down-shifting request signal (F);

12) parking brake signal (G).

Each one of the inputs 1 to 12 is enabled by a relay; said relays are generally designated by the reference numeral 32.

FIGS. 2 and 3 are tables listing optimum sequences and timings for the activation and deactivation of the above mentioned solenoids connected to the respective valves.

With reference to the above figures, the control process for the apparatus described in FIG. 1 is as follows.

Since the choice of the strategy for determining when to shift gears is well-known, the process according to the invention aims to find an appropriate control sequence for up-shifting and down-shifting, in terms of which solenoid must be activated, for how long, and according to which sequence, in order to achieve the required gear-shifting quality.

The time intervals defined by a minimum time and a maximum time for the various steps of the activation sequence in all the cases considered have been obtained in order to avoid the drawbacks of the known art, that is to say, to eliminate or substantially reduce impacts and vibrations during gear shifting. 1/48 of a second has been chosen as a time cycle.

The accelerator pedal 44 directly controls the vehicle speed both by means of the rpm rate of the engine and by means of the displacement ratio between the hydrostatic pump 2 and the hydrostatic motor 4.

This control system, although being excellent in normal conditions, may not be ideal in conditions that require all the possible power to be available, therefore with the Diesel engine 1 at its peak rpm, and at a reduced travel speed. In this regard, the valve 14 located below the so-called inching pedal is driven by the first portion of the stroke of the brake pedal before said braking action intervenes.

Said valve 14 has the purpose of reducing the speed of the hydrostatic motor 4 while the Diesel engine 1 runs at a constant rpm rate; the displacements of the hydrostatic pump 2 and of the hydrostatic motor 4 vary accordingly.

The valve 15, shown in FIG. 1 and termed as down-shifting valve, is insertable in the circuit to obtain the opposite effect, that is to say, to increase the displacement of the cylinder 18 so that the hydrostatic motor 4 increases its speed; the hydrostatic pump 2 and the hydrostatic motor 4 therefore vary their displacements accordingly.

The valve 19 that can be inserted in the circuit between the valve 16 and the piston 18 instead has the purpose of keeping the hydrostatic motor 4 always at its maximum output (low rpm rate and high output torque), discharging the cylinder 18, whereas the rpm rate of the Diesel engine 1 and the output of the pump 2 determine the output rate of the hydrostatic motor 4.

The table of FIG. 2, in the first column labeled "index", shows twenty different situations in which gear shifting can occur.

Five possibilities, termed as "modes" (0–4), are associated with each set of five indices for four different conditions: forward gear (F) or reverse gear (R), up-shifting (U), or down-shifting (D). The five possibilities or modes take into account the different conditions in which gear shifting can occur, that is to say:

mode 0=the hydrostatic motor 4 has a variable output and the accelerator 44 is in an intermediate position (that is to say, no kick-down);

mode 1=the hydrostatic motor 4 has a variable output and the accelerator 44 is in kick-down condition;

mode 2=the hydrostatic motor 4 has a fixed output and the accelerator 44 is in an intermediate position;

mode 3=the hydrostatic motor 4 has a fixed output and the accelerator 44 is in kick-down condition;

mode 4=very low travel speed (considered as maximum speed/7).

The above listed conditions are shown in the bottom left part of the table of FIG. 2.

The expression "accelerator 44 in kick-down condition" means that the pedal of the accelerator is fully depressed so as to activate a spring-loaded switch adapted to report to the control unit that the driver is requesting an "exceptional performance", for example when the driver must negotiate an upward slope and it is therefore necessary to down-shift.

We now consider the correct sequence and the activation times in the case of two gear-shifting examples.

In case of up-shifting (U) in normal conditions (that is to say, without kick-down), in forward gear (F) and with the hydrostatic motor 4 in variable-output condition (mode 0), by seeking the combination in the table shown in FIG. 2 one finds the index 1, which indicates the following sequence of steps:

selecting the neutral condition of the hydrostatic pump 2, that is to say, removing power from the solenoid 21, so that the valve 16 moves into the "neutral" position and the output of the pump drops to zero, at least $8/48$ s and no more than $32/48$ s after time zero, which is considered as the moment in which the conditions leading to the need to shift gear occur;

reselecting the forward gear at least $19/48$ s and no more than $64/48$ s after said time zero;

selecting up-shifting, that is shifting up to a higher gear by appropriate activation/disactivation of the gear solenoids 23 and 24, at least $12/48$ s and no more than 1 s after time zero;

activating the down-shifting valve 15 at least 0 s and no more than $4/48$ s after time zero;

deactivating the down-shifting valve 15 at least 0 s and no more than 1 s after time zero.

We now consider, again with reference to FIG. 2, an example of down-shifting (D) in forward gear (F) with the hydrostatic motor 4 in variable-output condition and without kick-down (mode 0). By looking this up in the table, this combination is found in the table shown in FIG. 2 under the index 11. Accordingly, the correct sequence to be performed and the corresponding timings are as follows:

selecting the neutral condition of the hydrostatic pump 2 at least 0 s and no more than $4/48$ s after time zero, when the gear-shifting conditions occur;

reselecting the forward gear at least $19/48$ s and no more than $35/48$ s after time zero;

selecting down-shifting, that is shifting down to a higher gear by appropriate activation/disactivation of the gear solenoids 23 and 24, at least $13/48$ s and no more than $50/48$ s after time zero;

activating the down-shifting valve 15 at least $8/48$ s and no more than $32/48$ s after time zero;

deactivating the down-shifting valve 15 at least $19/48$ s and no more than $40/48$ s after time zero.

The correct sequences relating to the other eighteen indices are similar, and reference should be made to the table shown in FIG. 2 for the corresponding timings.

If the transmission 5 has only two gears, control can occur by means of a three-position selector (1st locked speed—2nd locked speed—automatic) (inputs D and E) and the signal that reports that the hydrostatic motor 4 is locked at its maximum output (C) or with a processor that uses the same three inputs (C, D, and E) (1st speed locked with maximum motor output—1st speed locked—2nd speed locked—automatic).

A special control (designated by F in the control unit 20) provided in the driver's cabin to request down-shifting can be provided for particular situations.

If the control F is engaged and if kick-down is not engaged, for example in downhill conditions, hydrostatic braking is performed by placing the pump 2 in neutral conditions and then setting the hydrostatic motor 4 to the maximum output. As soon as the vehicle has slowed down sufficiently, reaching the maximum down-shifting speed, the first fixed gear is engaged and maintained.

If instead F is engaged and kick-down is also engaged, for example in uphill conditions, hydrostatic braking is not performed, but as soon as the vehicle reaches the maximum speed at which down-shifting is possible the first fixed speed is engaged and maintained.

It is evident that the invention fully achieves the intended aim and objects, by providing a process for the global control of a drive unit for a gearbox operated by a hydrostatic system, which allows, by virtue of a particular sequence for activating the electric valves of the circuit and by virtue of preset timings, to eliminate or substantially reduce the knocking and vibrations associated with gear shifts of the vehicle.

Accordingly, there is the advantage of greater travel comfort for the driver and for any passengers, who are no longer subjected to sudden jolts but enjoy smoother travel.

The mechanical components of the vehicle are furthermore stressed to a lesser extent, and therefore have a longer working life, leading ultimately to a reduction in maintenance costs.

The control process according to the invention is susceptible of numerous modifications and variations, all of which are within the scope of the inventive concept; all the details may furthermore be replaced with technically equivalent elements.

A possible variation to the process according to the invention consists in adding a step to the activation sequence described in FIG. 2. Said step relates, both during up-shifting and during down-shifting, to the setting of the gearbox in mechanical neutral position for at least 0 s and no more than $8/48$ s after time zero. This entails removing power from the solenoids 23 and 24 and is equivalent to introducing a slight delay between the disengagement of one gear and the next one, so as to avoid jerking during gear shifting.

The minimum and maximum timings related to this step for all the twenty possible situations (indices) are shown in the table provided in FIG. 3, which is similar to FIG. 2 with the addition of an extra column at the right end.

Another variation consists of the possibility of having a transmission with more than two gears and accordingly an equal number of gear-shifting activation solenoids.

In this case, the process according to the present invention can be applied in a manner that is similar to the above described two-gear case, following the described up-shifting and down-shifting control sequence.

The materials employed, as well as the dimensions, may of course be any according to the requirements and the state of the art.

What is claimed is:

1. Process for controlling a vehicle drive unit comprising a gearbox with at least two selectable gearings and a hydrostatic system having a hydrostatic pump driving a hydrostatic motor connected to the gearbox and a control valve in control of increasing the speed of the hydrostatic motor, the process comprising the steps of:

driving said hydrostatic pump in a selected one of a forward direction and a reverse direction;

selecting a first one of said at least two gearings of said gearbox;

selecting the neutral of the hydrostatic pump between 0 s and $32/48$ s after a time zero corresponding to a start of a shifting of the gearings of the gearbox;

reselecting said selected one of a forward direction and a reverse direction between 0 s and $64/48$ s after time zero;

shifting from said first one of said at least two gearings to a second one of said at least two gearings between 0 s and $52/48$ s after time zero;

activating the control valve between 0 s and $^{32}/_{48}$ s after time zero; and deactivating the control valve between 0 s and 1 s after time zero.

2. Process according to claim 1, comprising:

driving said hydrostatic pump in a forward direction;

selecting the neutral of the hydrostatic pump between 0 s and $^{32}/_{48}$ s after time zero;

reselecting the forward direction between 0 s and $^{64}/_{48}$ s after time zero;

shifting from said first one of said at least two gearings to said second one of said at least two gearings in which said second one is higher than said first one between 0 s and $^{52}/_{48}$ s after time zero;

activating the control valve between 0 s and $^{32}/_{48}$ s after time zero; and deactivating the control valve between 0 s and 1 s after time zero.

3. Process according to claim 2, further comprising the step of setting the gearbox to a mechanical neutral position at least 0 s and no more than $^{8}/_{48}$ s after time zero.

4. Process according to claim 1, comprising:

driving said hydrostatic pump in a forward direction;

selecting the neutral of the hydrostatic pump at least 0 s and no more than $^{4}/_{48}$ s after time zero;

reselecting the forward direction at least $^{7}/_{48}$ s and no more than $^{28}/_{48}$ s after time zero;

shifting from said first one of said at least two gearings to said second one of said at least two gearings in which said second one is higher than said first one at least $^{5}/_{48}$ s and no more than $^{20}/_{48}$ s after time zero;

activating the control valve at least 0 s and no more than $^{5}/_{48}$ s after time zero; and deactivating the control valve at least 0 s and no more than $^{4}/_{48}$ s after time zero.

5. Process according to claim 4, further comprising the step of setting the gearbox to a mechanical neutral position at least 0 s and no more than $^{9}/_{48}$ s after time zero.

6. Process according to claim 1, comprising:

driving said hydrostatic pumping a forward direction;

selecting the neutral of the hydrostatic pump at least 0 s and no more than $^{9}/_{48}$ s after time zero;

reselecting the forward direction at least $^{19}/_{48}$ s and no more than $^{40}/_{48}$ s after time zero;

shifting from said first one of said at least two gearings to said second one of said at least two gearing in which said second one is higher than said first one at least $^{5}/_{48}$ s and no more than $^{20}/_{48}$ s after time zero;

activating the control valve at least 0 s and no more than $^{8}/_{48}$ s after time zero; and deactivating the control valve at least 0 s and no more than $^{9}/_{48}$ s after time zero.

7. Process according to claim 6, further comprising the step of setting the gearbox to a mechanical neutral position at least 0 s and no more than $^{5}/_{48}$ s after time zero.

8. Process according to claim 1, comprising:

driving said hydrostatic pump in a forward direction;

selecting the neutral of the hydrostatic pump at least 0 s and no more than $^{5}/_{48}$ s after time zero;

reselecting the forward direction at least $^{19}/_{48}$ s and no more than $^{40}/_{48}$ s after time zero;

shifting from said first one of said at least two gearings to said second one of said at least two gearings in which said second one is higher than said first one at least $^{5}/_{48}$ s and no more than $^{20}/_{48}$ s after time zero;

activating the control valve at least 0 s and no more than $^{7}/_{48}$ s after time zero; and deactivating the control valve at least 0 s and no more than $^{8}/_{48}$ s after time zero.

9. Process according to claim 8, further comprising the step of setting the gearbox to a mechanical neutral position at least 0 s and no more than $^{4}/_{48}$ s after time zero.

10. Process according to claim 1, comprising:

driving said hydrostatic pump in a forward direction;

selecting the neutral of the hydrostatic pump at least 0 s and no more than $^{7}/_{48}$ s after time zero;

reselecting the forward direction at least 0 s and no more than $^{4}/_{48}$ s after time zero;

shifting from said first one of said at least two gearings to said second one of said at least two gearings in which said second one is higher than said first one at least 0 s and no more than $^{4}/_{48}$ s after time zero;

activating the control valve at least 0 s and no more than $^{6}/_{48}$ s after time zero; and deactivating the control valve at least 0 s and no more than $^{7}/_{48}$ s after time zero.

11. Process according to claim 10, further comprising the step of setting the gearbox to a mechanical neutral position at least 0 s and no more than $^{7}/_{48}$ s after time zero.

12. Process according to claim 1, comprising:

driving said hydrostatic pumping a reverse direction;

selecting the neutral of the hydrostatic pump at least $^{9}/_{48}$ s and no more than $^{30}/_{48}$ s after time zero;

reselecting the reverse direction at least $^{19}/_{48}$ s and no more than $^{60}/_{48}$ s after time zero;

shifting from said first one of said at least two gearings to said second one of said at least two gearings in which said second one is higher than said first one at least $^{12}/_{48}$ s and no more than $^{45}/_{48}$ s after time zero;

activating the control valve at least 0 s and no more than $^{4}/_{48}$ s after time zero; and deactivating the control valve at least 0 s and no more than $^{35}/_{48}$ s after time zero.

13. Process according to claim 12, further comprising the step of setting the gearbox to a mechanical neutral position at least 0 s and no more than $^{8}/_{48}$ s after time zero.

14. Process according to claim 1, comprising:

driving said hydrostatic pump in a reverse direction;

selecting the neutral of the hydrostatic pump at least 0 s and no more than $^{4}/_{48}$ s after time zero;

reselecting the reverse direction at least $^{7}/_{48}$ s and no more than $^{28}/_{48}$ s after time zero;

shifting from said first one of said at least two gearings to said second one of said at least two gearings in which said second one is higher than said first one at least $^{5}/_{48}$ s and no more than $^{20}/_{48}$ s after time zero;

activating the control valve at least 0 s and no more than $^{7}/_{48}$ s after time zero; and deactivating the control valve at least 0 s and no more than $^{4}/_{48}$ s after time zero.

15. Process according to claim 14, further comprising the step of setting the gearbox to a mechanical neutral position at least 0 s and no more than $^{5}/_{48}$ s after time zero.

16. Process according to claim 1, comprising:

driving said hydrostatic in a reverse direction;

selecting the neutral of the hydrostatic pump at least 0 s and no more than $^{7}/_{48}$ s after time zero;

reselecting the reverse direction at least $^{10}/_{48}$ s and no more than $^{40}/_{48}$ s after time zero;

shifting from said first one of said at least two gearings to said second one of said at least two gearings in which said second one is higher than said first one at least $^{5}/_{48}$ s and no more than $^{20}/_{48}$ s after time zero;

activating the control valve at least 0 s and no more than $^{5}/_{48}$ s after time zero; and deactivating the control valve at least 0 s and no more than $^{7}/_{48}$ s after time zero.

17. Process according to claim 16, further comprising the step of setting the gearbox to a mechanical neutral position at least 0 s and no more than $^{6}/_{48}$ s after time zero.

18. Process according to claim 1, comprising:

driving said hydrostatic pump in a reverse direction;

selecting the neutral of the hydrostatic pump at least 0 s and no more than $^{5}/_{48}$ s after time zero;

reselecting the reverse direction at least $^{10}/_{48}$ s and no more than $^{40}/_{48}$ s after time zero;

shifting from said first one of said at least two gearings to said second one of said at least two gearings in which said second one is higher than said first one at least $^{5}/_{48}$ s and no more than $^{20}/_{48}$ s after time zero;

activating the control valve at least 0 s and no more than $^{8}/_{48}$ s after time zero; and deactivating the control valve at least 0 s and no more than $^{5}/_{48}$ s after time zero.

19. Process according to claim 18, further comprising the step of setting the gearbox to a mechanical neutral position at least 0 s and no more than $^{4}/_{48}$ s after time zero.

20. Process according to claim 1, comprising:

driving said hydrostatic pump in a reverse direction;

selecting the neutral of the hydrostatic pump at least 0 s and no more than $^{6}/_{48}$ s after time zero;

reselecting the reverse direction at least 0 s and no more than $^{4}/_{48}$ s after time zero;

shifting from said first one of said at least two gearings to said second one of said at least two gearings in which said second one is higher than said first one at least 0 s and no more than $^{4}/_{48}$ s after time zero;

activating the control valve at least 0 s and no more than $^{6}/_{48}$ s after time zero; and deactivating the control valve at least 0 s and no more than $^{6}/_{48}$ s after time zero.

21. Process according to claim 20, further comprising the step of setting the gearbox to a mechanical neutral position at least 0 s and no more than $^{7}/_{48}$ s after time zero.

22. Process according to claim 1, comprising:

driving said hydrostatic pump in a forward direction;

selecting the neutral of the hydrostatic pump at least 0 s and no more than $^{4}/_{48}$ s after time zero;

reselecting the forward direction at least $^{10}/_{48}$ s and no more than $^{35}/_{48}$ s after time zero;

shifting from said first one of said at least two gearings to said second one of said at least two gearings in which said second one is lower than said first one at least $^{13}/_{48}$ s and no more than $^{50}/_{48}$ s after time zero;

activating the control valve at least $^{8}/_{48}$ s and no more than $^{32}/_{48}$ s after time zero; and deactivating the control valve at least $^{10}/_{48}$ s and no more than $^{40}/_{48}$ s after time zero.

23. Process according to claim 22, further comprising the step of setting the gearbox to a mechanical neutral position at least 0 s and no more than $^{9}/_{48}$ s after time zero.

24. Process according to claim 1, comprising:

driving said hydrostatic pump in a forward direction;

selecting the neutral of the hydrostatic pump at least 0 s and no more than $^{5}/_{48}$ s after time zero;

reselecting the forward direction at least $^{10}/_{48}$ s and no more than $^{35}/_{48}$ s after time zero;

shifting from said first one of said at least two gearings to said second one of said at least two gearings in which said second one is lower than said first one at least $^{13}/_{48}$ s and no more than $^{52}/_{48}$ s after time zero;

activating the control valve at least $^{8}/_{48}$ s and no more than $^{32}/_{48}$ s after time zero; and deactivating the control valve at least $^{10}/_{48}$ s and no more than $^{35}/_{48}$ s after time zero.

25. Process according to claim 24, further comprising the step of setting the gearbox to a mechanical neutral position at least 0 s and no more than $^{4}/_{48}$ s after time zero.

26. Process according to claim 1, comprising:

driving said hydrostatic pump in a forward direction;

selecting the neutral of the hydrostatic pump at least 0 s and no more than $^{7}/_{48}$ s after time zero;

reselecting the forward direction at least $^{10}/_{48}$ s and no more than $^{40}/_{48}$ s after time zero;

shifting from said first one of said at least two gearings to said second one of said at least two gearings in which said second one is lower than said first one at least $^{13}/_{48}$ s and no more than $^{52}/_{48}$ s after time zero;

activating the control valve at least $^{8}/_{48}$ s and no more than $^{30}/_{48}$ s after time zero; and deactivating the control valve at least $^{10}/_{48}$ s and no more than $^{35}/_{48}$ s after time zero.

27. Process according to claim 26, further comprising the step of setting the gearbox to a mechanical neutral position at least 0 s and no more than $^{7}/_{48}$ s after time zero.

28. Process according to claim 1, comprising:

driving said hydrostatic pump in a forward direction;

selecting the neutral of the hydrostatic pump at least 0 s and no more than $^{8}/_{48}$ s after time zero;

reselecting the forward direction at least $^{10}/_{48}$ s and no more than $^{40}/_{48}$ s after time zero;

shifting from said first one of said at least two gearings to said second one of said at least two gearings in which said second one is lower than said first one at least $^{13}/_{48}$ s and no more than $^{50}/_{48}$ s after time zero;

activating the control valve at least $^{8}/_{48}$ s and no more than $^{30}/_{48}$ s after time zero; and deactivating the control valve at least $^{10}/_{48}$ s and no more than $^{40}/_{48}$ s after time zero.

29. Process according to claim 28, further comprising the step of setting the gearbox to a mechanical neutral position at least 0 s and no more than $^{5}/_{48}$ s after time zero.

30. Process according to claim 1, comprising:

driving said hydrostatic pump in a forward direction;

selecting the neutral of the hydrostatic pump at least 0 s and no more than $^{9}/_{48}$ s after time zero;

reselecting the forward direction at least 0 s and no more than $^{4}/_{48}$ s after time zero;

shifting from said first one of said at least two gearings to said second one of said at least two gearings in which said second one is lower than said first one at least 0 s and no more than $^{4}/_{48}$ s after time zero;

activating the control valve at least 0 s and no more than $^{4}/_{48}$ s after time zero; and deactivating the control valve at least 0 s and no more than $^4/_{48}$ s after time zero.

31. Process according to claim 30, further comprising the step of setting the gearbox to a mechanical neutral position at least 0 s and no more than $^9/_{48}$ s after time zero.

32. Process according to claim 1, wherein said vehicle is in a condition (index 16) for down-shifting (D) in a reverse gear (R), in mode (0); and wherein said control process, provided by processing and control means having a plurality of inputs and outputs, comprises the steps that consist in: comprising:

driving said hydrostatic pump in a reverse direction;
selecting the neutral of the hydrostatic pump at least 0 s and no more than $^4/_{48}$ s after time zero;
reselecting the reverse direction at least $^{10}/_{48}$ s and no more than $^{35}/_{48}$ s after time zero;
shifting from said first one of said at least two gearings to said second one of said at least two gearings in which said second one is lower than said first one at least $^{13}/_{48}$ s and no more than $^{50}/_{48}$ s after time zero;
activating the control valve at least $^8/_{48}$ s and no more than $^{30}/_{48}$ s after time zero; and
deactivating the control valve at least $^{19}/_{48}$ s and no more than $^{35}/_{48}$ s after time zero.

33. Process according to claim 32, further comprising the step of setting the gearbox to a mechanical neutral position at least 0 s and no more than $^9/_{48}$ s after time zero.

34. Process according to claim 1, comprising:

driving said hydrostatic pump in a reverse direction;
selecting the neutral of the hydrostatic pump at least 0 s and no more than $^7/_{48}$ s after time zero;
reselecting the reverse direction at least $^{10}/_{48}$ s and no more than $^{40}/_{48}$ s after time zero;
shifting from said first one of said at least two gearings to said second one of said at least two gearings in which said second one is lower than said first one at least $^{13}/_{48}$ s and no more than $^{52}/_{48}$ s after time zero;
activating the control valve at least $^8/_{48}$ s and no more than $^{30}/_{48}$ s after time zero; and
deactivating the control valve at least $^{19}/_{48}$ s and no more than $^{40}/_{48}$ s after time zero.

35. Process according to claim 34, further comprising the step of setting the gearbox to a mechanical neutral position at least 0 s and no more than $^7/_{48}$ s after time zero.

36. Process according to claim 1, comprising:

driving said hydrostatic pump in a reverse direction;
selecting the neutral of the hydrostatic pump at least 0 s and no more than $^5/_{48}$ s after time zero;
reselecting the reverse direction at least $^{10}/_{48}$ s and no more than $^{35}/_{48}$ s after time zero;
shifting from said first one of said at least two gearings to said second one of said at least two gearings in which said second one is lower than said first one at least $^{13}/_{48}$ s and no more than $^{50}/_{48}$ s after time zero;
activating the control valve at least $^8/_{48}$ s and no more than $^{32}/_{48}$ s after time zero; and
deactivating the control valve at least $^{19}/_{48}$ s and no more than $^{35}/_{48}$ s after time zero.

37. Process according to claim 36, further comprising the step of setting the gearbox to a mechanical neutral position at least 0 s and no more than $^5/_{48}$ s after time zero.

38. Process according to claim 1, comprising:

driving said hydrostatic pump in a reverse direction;
selecting the neutral of the hydrostatic pump at least 0 s and no more than $^9/_{48}$ s after time zero;
reselecting the reverse direction at least $^{10}/_{48}$ s and no more than $^{40}/_{48}$ s after time zero;
shifting from said first one of said at least two gearings to said second one of said at least two gearings in which said second one is lower than said first one at least $^{13}/_{48}$ s and no more than $^{52}/_{48}$ s after time zero;
activating the control valve at least $^8/_{48}$ s and no more than $^{32}/_{48}$ s after time zero; and
deactivating the control valve at least $^{19}/_{48}$ s and no more than $^{40}/_{48}$ s after time zero.

39. Process according to claim 38, further comprising the step of setting the gearbox to a mechanical neutral position at least 0 s and no more than $^4/_{48}$ s after time zero.

40. Process according to claim 1, comprising:

driving said hydrostatic pump in a reverse direction;
selecting the neutral of the hydrostatic pump at least 0 s and no more than $^9/_{48}$ s after time zero;
reselecting the reverse direction at least 0 s and no more than $^4/_{48}$ s after time zero;
shifting from said first one of said at least two gearings to said second one of said at least two gearings in which said second one is lower than said first one at least 0 s and no more than $^4/_{48}$ s after time zero;
activating the control valve at least 0 s and no more than $^4/_{48}$ s after time zero; and
deactivating the control valve at least 0 s and no more than $^4/_{48}$ s after time zero.

41. Process according to claim 40, further comprising the step of setting the gearbox to a mechanical neutral position at least 0 s and no more than $^9/_{48}$ s after time zero.

42. A vehicle drive unit comprising:
a gearbox with at least two gear settings;
a hydrostatic motor connected to the gearbox;
a hydrostatic pump for driving the hydrostatic motor;
means for driving said hydrostatic pump;
a speed control valve in control of increasing the speed of the hydrostatic motor;
gear shifting means for shifting from a first gear setting to a second gear setting of said at least two gear settings;
drive shifting means for selectively shifting between a reverse drive, a forward drive, and a neutral drive of said hydrostatic pump;
and control means for selectively activating and deactivating said speed control valve, correspondingly with operation of said drive shifting means placing said hydrostatic pump from one of said forward and reverse drives into said neutral drive and back into said one of said forward and reverse drives, and correspondingly with operation of said gear shifting means from said first gear setting to said second gear setting.

43. A vehicle drive unit comprising:
a gearbox with at least two gear settings;
a hydrostatic motor connected to the gearbox;
a hydrostatic pump for driving the hydrostatic motor;
means for driving said hydrostatic pump;
a speed control valve in control of increasing the speed of the hydrostatic motor;
gear shifting apparatus operative for shifting from a first gear setting to a second gear setting of said at least two gear settings;

drive shifting apparatus operative for selectively shifting between a reverse drive, a forward drive, and a neutral drive of said hydrostatic pump;

and control apparatus operative for selectively activating and deactivating said speed control valve, correspondingly with operation of said drive shifting apparatus placing said hydrostatic pump from one of said forward and reverse drives into said neutral drive and back into said one of said forward and reverse drives, and correspondingly with operation of said gear shifting apparatus from said first gear setting to said second gear setting.

* * * * *